US012682098B2

(12) United States Patent
Hozumi et al.

(10) Patent No.: US 12,682,098 B2
(45) Date of Patent: Jul. 14, 2026

(54) INFORMATION PROCESSING DEVICE, INFORMATION PROCESSING METHOD, AND RECORDING MEDIUM RECORDED WITH PROGRAM FOR SECRECY LEVEL CONTROL

(71) Applicant: TOYOTA JIDOSHA KABUSHIKI KAISHA, Toyota (JP)

(72) Inventors: Masato Hozumi, Mishima (JP); Masao Yano, Shizuoka-ken (JP); Ryo Aoki, Okazaki (JP); Tetsuya Shoji, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/480,707

(22) Filed: Oct. 4, 2023

(65) Prior Publication Data

US 2024/0160767 A1     May 16, 2024

(30) Foreign Application Priority Data

Nov. 11, 2022    (JP) ................................. 2022-181360

(51) Int. Cl.
| | |
|---|---|
| *G06F 21/62* | (2013.01) |
| *G06F 21/45* | (2013.01) |
| *G06T 11/26* | (2026.01) |
| *G06F 21/31* | (2013.01) |
| *G06T 11/20* | (2026.01) |

(52) U.S. Cl.
CPC .......... *G06F 21/6218* (2013.01); *G06T 11/26* (2026.01)

(58) Field of Classification Search
None
See application file for complete search history.

(56) References Cited

U.S. PATENT DOCUMENTS

| | | | |
|---|---|---|---|
| 10,296,761 B2* | 5/2019 | Jebara | G06F 21/6245 |
| 2015/0332489 A1* | 11/2015 | Birchfield | G06T 11/206 |
| | | | 345/440 |
| 2016/0357799 A1* | 12/2016 | Choi | G06F 21/6227 |
| 2021/0019292 A1* | 1/2021 | Kholodkov | G06F 16/215 |
| 2022/0004582 A1 | 1/2022 | Yano et al. | |
| 2022/0129700 A1* | 4/2022 | Lin | G06F 21/6245 |
| 2023/0056706 A1* | 2/2023 | Irving | G06N 3/092 |
| 2023/0306127 A1* | 9/2023 | Shua | G06F 21/6218 |
| 2024/0095389 A1* | 3/2024 | Lin | G06F 21/6218 |

FOREIGN PATENT DOCUMENTS

JP        2022-12994 A     1/2022

OTHER PUBLICATIONS

A Privacy Mechanism for Access Controlled Graph Data. Arshad et al. IEEE. (Year: 2019).*
Dynamic Security Risk Management Using Bayesian Attack Graphs. Poolsappasit et . IEEE. (Year: 2012).*

* cited by examiner

*Primary Examiner* — Venkat Perungavoor
(74) *Attorney, Agent, or Firm* — Sughrue Mion, PLLC

(57) ABSTRACT

An information processing device including a conversion section that converts plural data related to plural materials into vectors in a latent space, and a reception section that displays a graph plotted with the plural data according to the vectors in the latent space, that receives a specification of at least one of the data on the graph, and that also receives a change to a secrecy level or authorized disclosure parties of the data specified.

9 Claims, 6 Drawing Sheets

△  IN-HOUSE DATA (OPEN)

▪  IN-HOUSE DATA (CLOSED)

○  JOINT RESEARCH COLLABORATOR DATA (OPEN)

▫  JOINT RESEARCH COLLABORATOR DATA (CLOSED)

×  DATABASE (OPEN)

FIG.2B

ID: xxxxxx

MATERIAL COMPOSITION: AxByCz

MEASUREMENT DATA: xxxxxxx

ANALYSIS DATA: xxxxxxx

| 51 | 54 | 55 | 56 |
|----|----|----|----|
| CPU | INPUT/ OUTPUT I/F | R/W SECTION | NETWORK I/F |

57

STORAGE SECTION

MEMORY

53

52

INFORMATION PROCESSING DEVICE, INFORMATION PROCESSING METHOD, AND RECORDING MEDIUM RECORDED WITH PROGRAM FOR SECRECY LEVEL CONTROL

CROSS-REFERENCE TO RELATED APPLICATION

This application is based on and claims priority under 35 USC 119 from Japanese Patent Application No. 2022-181360 filed on Nov. 11, 2022, the disclosure of which is incorporated by reference herein.

BACKGROUND

Technical Field

The present disclosure relates to an information processing device, an information processing method, and a recording medium recorded with a program.

Related Art

An information processing system disclosed in Japanese Patent Application Laid-Open (JP-A) No. 2022-012994 is able to appropriately manage data having a high secrecy level in a material analysis service over a network. In the information processing system disclosed in JP-A No. 2022-012994, data related to material measurements is divided into high and low secrecy levels, paired with data IDs, and pairs of low secrecy level data and their data IDs are transmitted and received.

There is no consideration given to changing a secrecy level or authorized disclosure parties in the information processing system of JP-A No. 2022-012994. There is room for improvement in achieving both convenience and data secrecy when changing the secrecy level and the authorized disclosure parties of the data.

SUMMARY

An object of the present disclosure is to achieve both convenience and data secrecy when changing a secrecy level and authorized disclosure parties of data.

A first aspect is an information processing device including a conversion section that converts plural data related to plural materials into vectors in a latent space, and a reception section that displays a graph plotted with the plural data according to the vectors in the latent space, and receives a specification of at least one of the data on the graph, and also receive a change to a secrecy level or authorized disclosure parties of the data specified.

In the information processing device according to the first aspect, the conversion section converts plural data related to plural materials into vectors in the latent space. Reference here to "data" includes, for example, measurement data related to material samples measured by measurement methods and analysis data resulting from measurement data being analyzed by analysis methods. Moreover, "vectors in the latent space" are vectors resulting from converting data using a conversion method such as dimensionality reduction and are, for example, latent representations extracted using a neural network. The reception section displays the graph plotted with the plural data according to the vectors in the latent space, and receives specification of the at least one data on the graph, and also receives a change to the secrecy level or the authorized disclosure parties of the data specified. Reference here to "secrecy level" means a value indicating a secrecy of the data, and is employed when determining whether or not to disclose the data. "Authorized disclosure parties" is a range of users authorized for disclosure of the data. This thereby enables both convenience and data secrecy to be achieved when changing the secrecy level or authorized disclosure parties of the data.

An information processing device according to a second aspect is the information processing device according to the first aspect further including a verification section that performs verification processing of a user when a change to lower the secrecy level or a change to increase the authorized disclosure parties has been received.

In the information processing device according to the second aspect the verification section performs user verification processing when a change to lower the secrecy level or a change to increase the authorized disclosure parties has been received. The change to lower the secrecy level or the change to increase the authorized disclosure parties is accordingly only able to be performed when user verification processing has succeeded. This thereby enables mistaken lowering of the secrecy level of the data to be suppressed.

An information processing device according to a third aspect is the information processing device according to the first aspect or the second aspect further including a determination section that, based on receipt of a specification of the data on the graph and on the secrecy level or the authorized disclosure parties of the specified data, determines whether or not information related to the data is allowed to be displayed to a user, and further including an information display section that displays the information related to the specified data in a case in which a determination has been made that the information related to the data is allowed to be displayed to the user.

In the information processing device according to the third aspect, the determination section determines whether or not the information related to the data is allowed to be displayed to the user based on receipt of the specification of the data on the graph and on the secrecy level or authorized disclosure parties of the specified data. The information display section displays the information related to the specified data in cases in which determination has been made that the information related to the data is allowed to be displayed to the user. This accordingly enables the convenience to be raised when displaying information related to the data.

A fourth aspect is an information processing method including converting plural data related to plural materials into vectors in a latent space, displaying a graph plotted with the plural data according to the vectors in the latent space, receiving a specification of at least one of the data on the graph, and also receiving a change to a secrecy level or authorized disclosure parties of the data specified.

In the information processing method according to the fourth aspect, the plural data related to the plural materials is converted into the vectors in the latent space. The graph plotted with the plural data according to the vectors in the latent space is then displayed, and the specification of the at least one data on the graph is received and a change to a secrecy level or authorized disclosure parties of the data specified is also received. This thereby enables both convenience and data secrecy to be achieved when changing the secrecy level or authorized disclosure parties of the data.

A program recorded on a non-transitory recording medium of the fifth aspect is a program that causes a computer to perform processing. The processing includes converting plural data related to plural materials into vectors in a latent space, displaying a graph plotted with the plural data according to the vectors in the latent space, receiving a specification of at least one of the data on the graph, and also receiving a change to a secrecy level or authorized disclosure parties of the data specified.

In the program recorded on a non-transitory recording medium of the fifth aspect, the computer converts the plural data related to the plural materials into the vectors in the latent space. The computer displays the graph plotted with the plural data according to the vectors in the latent space. The computer receives the specification of the at least one data on the graph, and also receives the change to the secrecy level or to the authorized disclosure parties of the data specified. This thereby enables both convenience and data secrecy to be achieved when changing the secrecy level or authorized disclosure parties of the data.

The present disclosure exhibits the advantageous effect of being able to achieve both convenience and data secrecy when changing the secrecy level or authorized disclosure parties of the data.

BRIEF DESCRIPTION OF THE DRAWINGS

Exemplary embodiments of the present disclosure will be described in detail based on the following figures, wherein:

FIG. 2B is a diagram illustrating an example of a display of a data ID, material composition, measurement data, and analysis data;

FIG. 3 is a diagram illustrating an example of a configuration of a computer of a cloud server and a user terminal according to an exemplary embodiment;

DETAILED DESCRIPTION

Description follows regarding an information processing system of an exemplary embodiment, with reference to the drawings.

Figure 1:
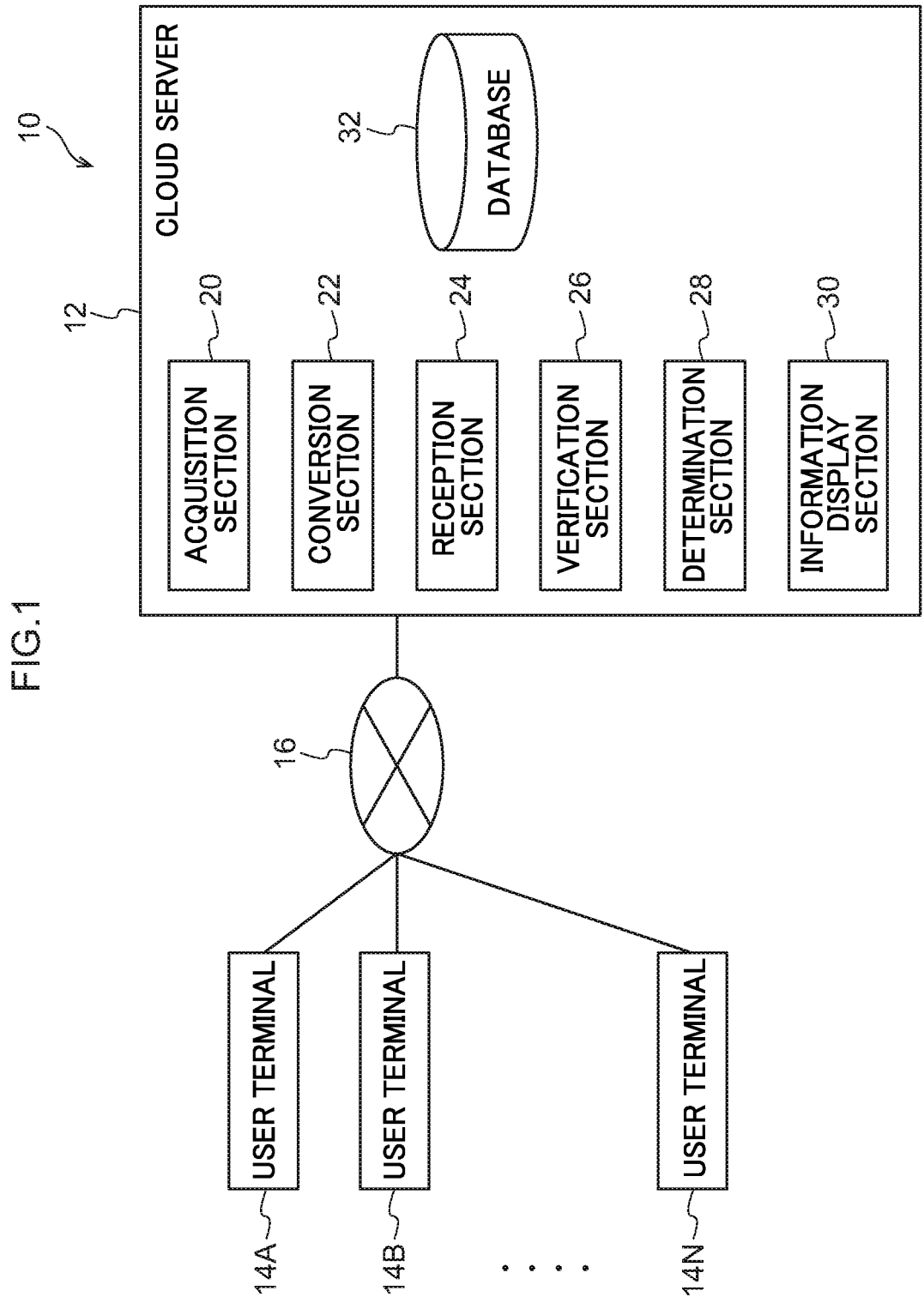
FIG. 1 is a schematic block diagram of an information processing system according to an exemplary embodiment.

FIG. 1 is a block diagram illustrating an example of a functional configuration of an information processing system 10 according to an exemplary embodiment. The information processing system 10 includes, as illustrated in FIG. 1, plural user terminals 14A, 14B, . . . , 14N and a cloud server 12 serving as an example of an information processing device. The plural user terminals 14A, 14B, . . . , 14N and the cloud server 12 are, for example, connected together over a network 16, such as the internet. Note that a single user terminal referred to below will be called simply user terminal 14. The cloud server 12 is an example of an information processing device.

User Terminal

Each of the user terminals 14A to 14N transmits measurement data related to a material sample measured using plural measurement methods to the cloud server 12.

Each of the plural user terminals 14A, 14B, . . . , 14N is operated by a different user of plural users.

The users each input measurement data related to an analysis target material sample to the user terminal 14 they themselves are operating. The measurement data related to the analysis target material sample includes, for example, data measured using a method such as X-ray diffraction, small angle X-ray scattering, or the like, data measured using an microscope, data measured using Raman spectrometry, and data measured using infrared spectrometry.

Cloud Server

The cloud server 12 stores the measurement data of plural material samples, and for each of the plural material samples stores analysis data expressing analysis results of analyzing the material samples from the measurement data using an analysis method. For example, the material samples are analyzed from the measurement data using an analysis method on the measurement data such as an X-ray diffraction analysis method, a small angle X-ray scattering analysis method, a microscope image analysis method, a Raman spectrometry analysis method, or an infrared spectrometry analysis method.

The cloud server 12 sets a secrecy level or authorized disclosure parties for each of the plural items of material sample data. When a display request for data of a specified material sample is received from one of the user terminals 14A to 14N, the measurement data and the analysis data of that material sample is displayed according to the secrecy level or authorized disclosure parties set for data of that material sample data.

More specifically as illustrated in FIG. 1, the cloud server 12 includes functions of an acquisition section 20, a conversion section 22, a reception section 24, a verification section 26, a determination section 28, an information display section 30, and a database 32.

The acquisition section 20 acquires measurement data from the plural user terminals 14A to 14N related to the plural material samples as measured by a measurement method, and stores this measurement data in the database 32.

The acquisition section 20 employs an analysis method for each of the plural material samples to analyze the material sample from the measurement data, acquires analysis data expressing the analysis result, and stores this in the database 32.

The conversion section 22 takes plural items of data related to the plural material samples and converts these into vectors in a latent space using a conversion method such as dimensionality reduction or the like. The data related to material samples referred to here includes both measurement data and analysis data. The vectors in the latent space are, for example, latent representations extracted using a neural network. This latent space is a space defined by values representing feature information extracted from the data (latent representations).

Figure 2A:
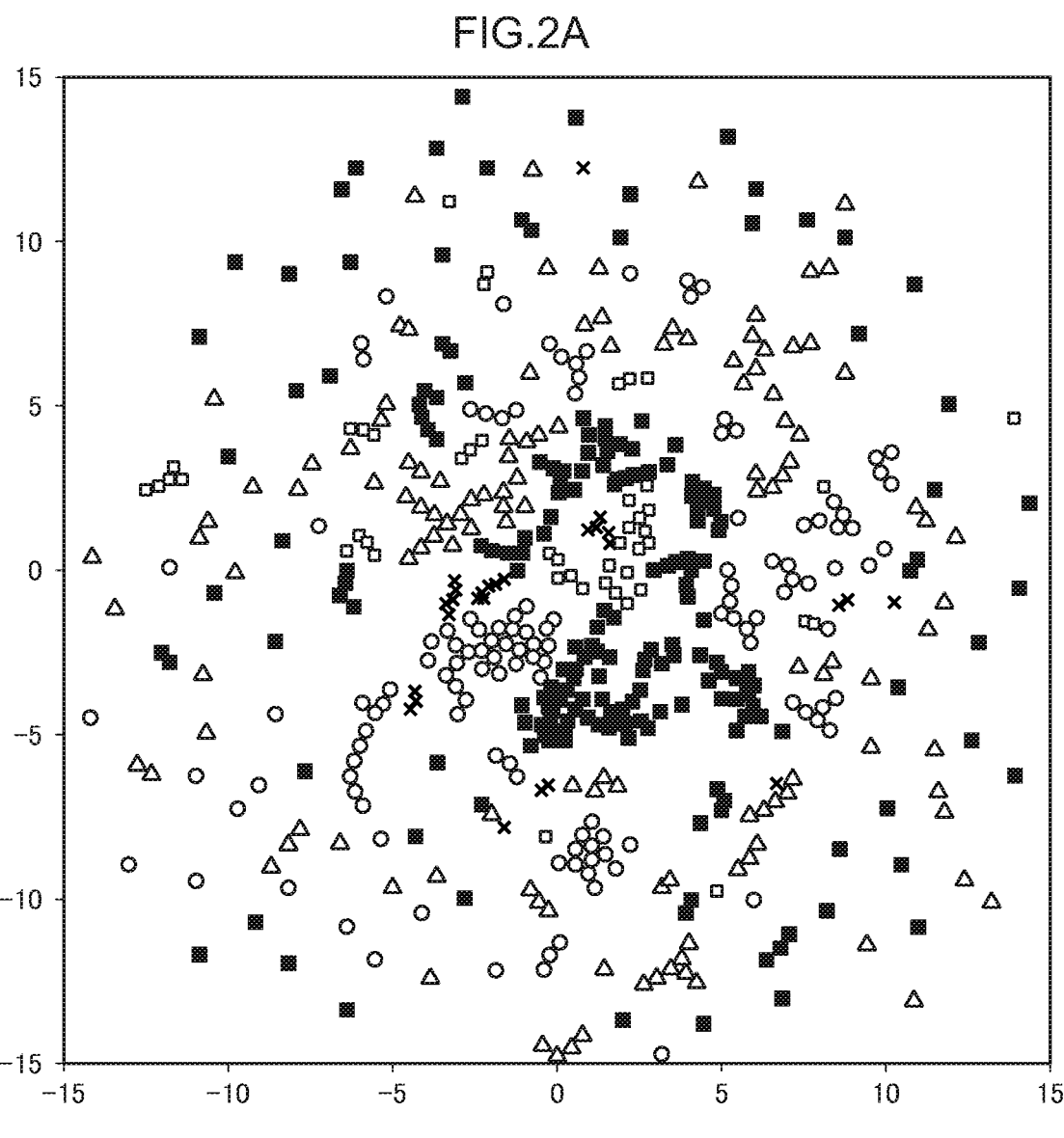
FIG. 2A is a diagram illustrating an example of a graph.

The reception section 24 displays a graph plotted with the data related to the plural material samples according to the vectors in the latent space. For example, a graph as illustrated in FIG. 2A is displayed. FIG. 2A illustrates an example in which vectors in a latent space have been dimensionally reduced to two dimensional vectors using a uniform manifold approximation and projection (UMAP), and data related to the material sample has been plotted at coordinates corresponding to the dimensionally-reduced two dimensional vectors.

Figure 2B:
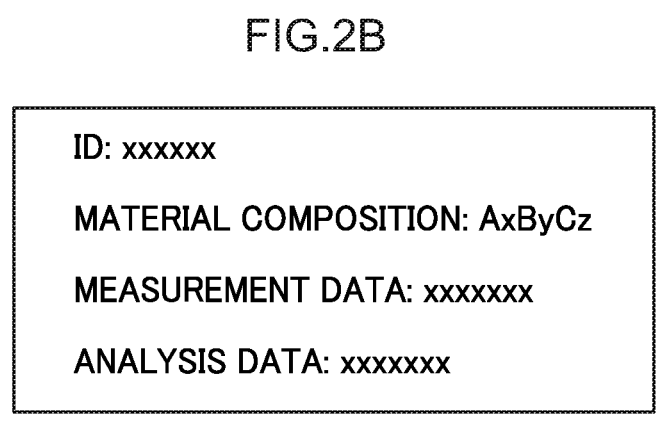

Moreover, this illustrates an example in which data plotted as in-house data includes open data that is allowed to be disclosed to all users, and closed data that is only allowed to be disclosed to some users. Moreover, this illustrates an example in which the data plotted as data of a joint research collaborator includes open data that is allowed to be disclosed to all users, and closed data that is only allowed to be disclosed to some users. Other data illustrates an example of open data that is allowed to be disclosed to all users. A data ID is displayed when a plotted point on the graph is selected on the user terminal 14. In cases in which the data is data allowed to be disclosed, then the data ID, material composition, measurement data, and analysis data is displayed as illustrated in FIG. 2B.

The reception section 24 receives specification of at least one material sample on the graph from the user terminal 14, and also receives changes to the secrecy level or authorized disclosure parties of the data related to the specified material sample. More specifically, the reception section 24 receives the specification of the at least one material sample by receiving selection of a plot on the graph being displayed on the user terminal 14. Or alternatively, the reception section 24 receives the specification of the at least one material sample plotted in an area by receiving specification of the area on the graph being displayed on the user terminal 14. A change screen for receiving changes to the secrecy level or authorized disclosure parties of the data related to the specified material sample is displayed on the user terminal 14, and changes to the secrecy level or authorized disclosure parties are received from the user terminal 14.

The verification section 26 performs user verification processing when a change to lower the secrecy level is received or when a change to increase the authorized disclosure parties is received, and a change to lower the secrecy level or a change to increase the authorized disclosure parties is performed in cases in which verification succeeded. More specifically, the user verification processing determines whether or not the user of the user terminal 14 is a user allowed to perform a change to lower the secrecy level or a change to increase the authorized disclosure parties.

When the reception section 24 has received from the user terminal 14 specification of a material sample on the graph being displayed on the user terminal 14, the determination section 28 determines whether or not to display information related to the data to the user based on the secrecy level or authorized disclosure parties of the data related to the specified material sample. More specifically, the determination section 28 determines not to display the information related to the data to the user in cases in which the secrecy level of the data related to the specified material sample is higher than a reference value corresponding to the user of the user terminal 14. However, the determination section 28 determines to display the information related to the data to the user in cases in which the secrecy level of the data related to the specified material sample is not higher than the reference value corresponding to the user of the user terminal 14.

Moreover, the determination section 28 determines not to display the information related to the data to the user in cases in which the user of the user terminal 14 is not included in the authorized disclosure parties of the data related to the specified material sample. However, the determination section 28 determines to display the information related to the data to the user in cases in which the user of the user terminal 14 is included in the authorized disclosure parties of the data related to the specified material sample.

In cases in which determination is that the information related to the data is allowed to be displayed to the user, the information display section 30 displays various data, including measurement data and analysis data, as the data related to the specified material sample on the user terminal 14.

Figure 3:
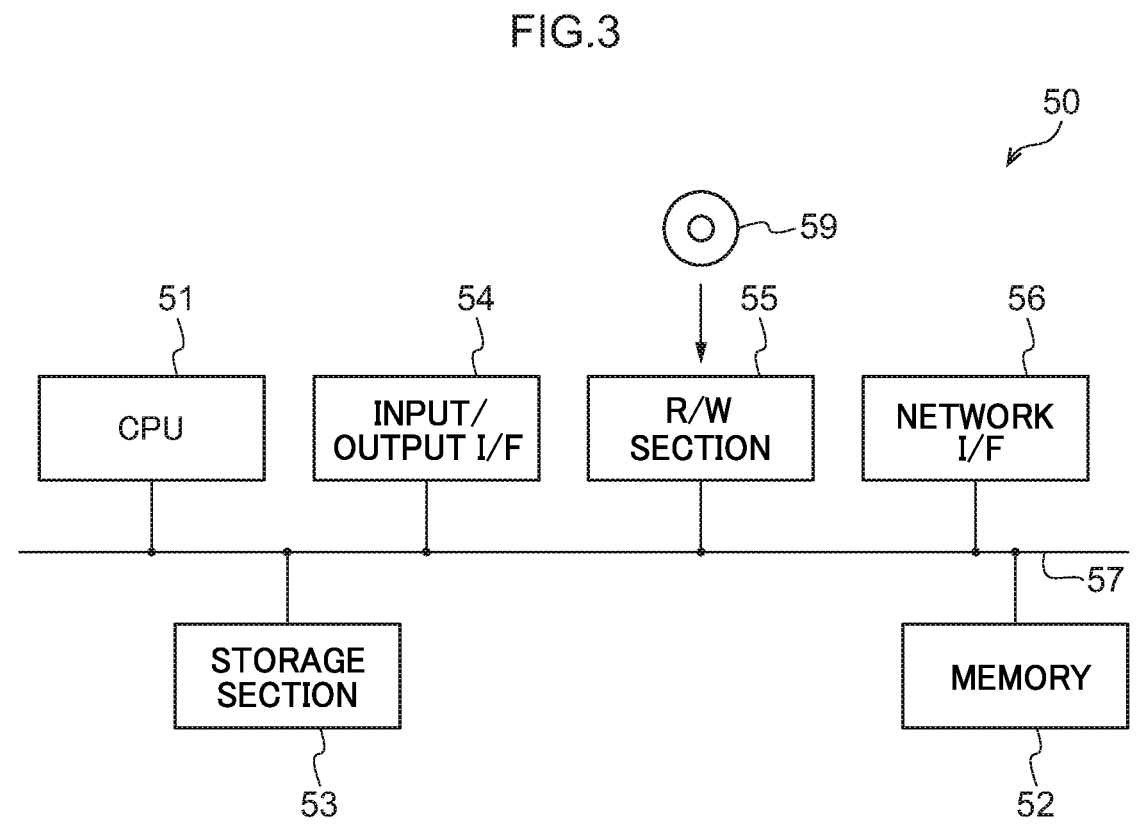

The user terminal 14 and the cloud server 12 may each, for example, be implemented by a computer 50 such as illustrated in FIG. 3. The computer 50 implementing the user terminal 14 and the cloud server 12 includes a CPU 51, a memory 52 serving as a temporary storage area, and a non-transitory storage section 53. The computer 50 includes an input/output interface (I/F) 54 connected to an input/output device or the like (omitted in the drawings), a read/write (R/W) section 55 that controls reading and writing of data to a recording medium 59. The computer 50 also includes a network I/F 56 that is connected to a network such as the internet. The CPU 51, the memory 52, the storage section 53, the input/output I/F 54, the R/W section 55, and the network I/F 56 are connected together through a bus 57. The CPU 51 serves as an example of a processor.

The storage section 53 may be implemented by a hard disk drive (HDD), solid state drive (SSD), flash memory, or the like. A program to cause a computer to function is stored on the storage section 53 serving as a storage medium. The CPU 51 reads the program from the storage section 53, expands the program in the memory 52, and sequentially executes processes included in the program.

Next, description follows regarding operation of the information processing system 10 of an exemplary embodiment.

When measurement data related to a material sample is input to the user terminal 14, the measurement data related to the material sample is transmitted to the cloud server 12. When the measurement data related to the material sample is transmitted from the user terminal 14 to the cloud server 12, the cloud server 12 stores the measurement data related to the material sample in the database 32. Measurement data related to plural material samples is thereby stored in the database 32.

For each of the plural material samples, the cloud server 12 uses an analysis method to analyze the material sample from the measurement data stored in the database 32, acquires analysis data expressing an analysis result, and stores the analysis result in the database 32.

Figure 4:
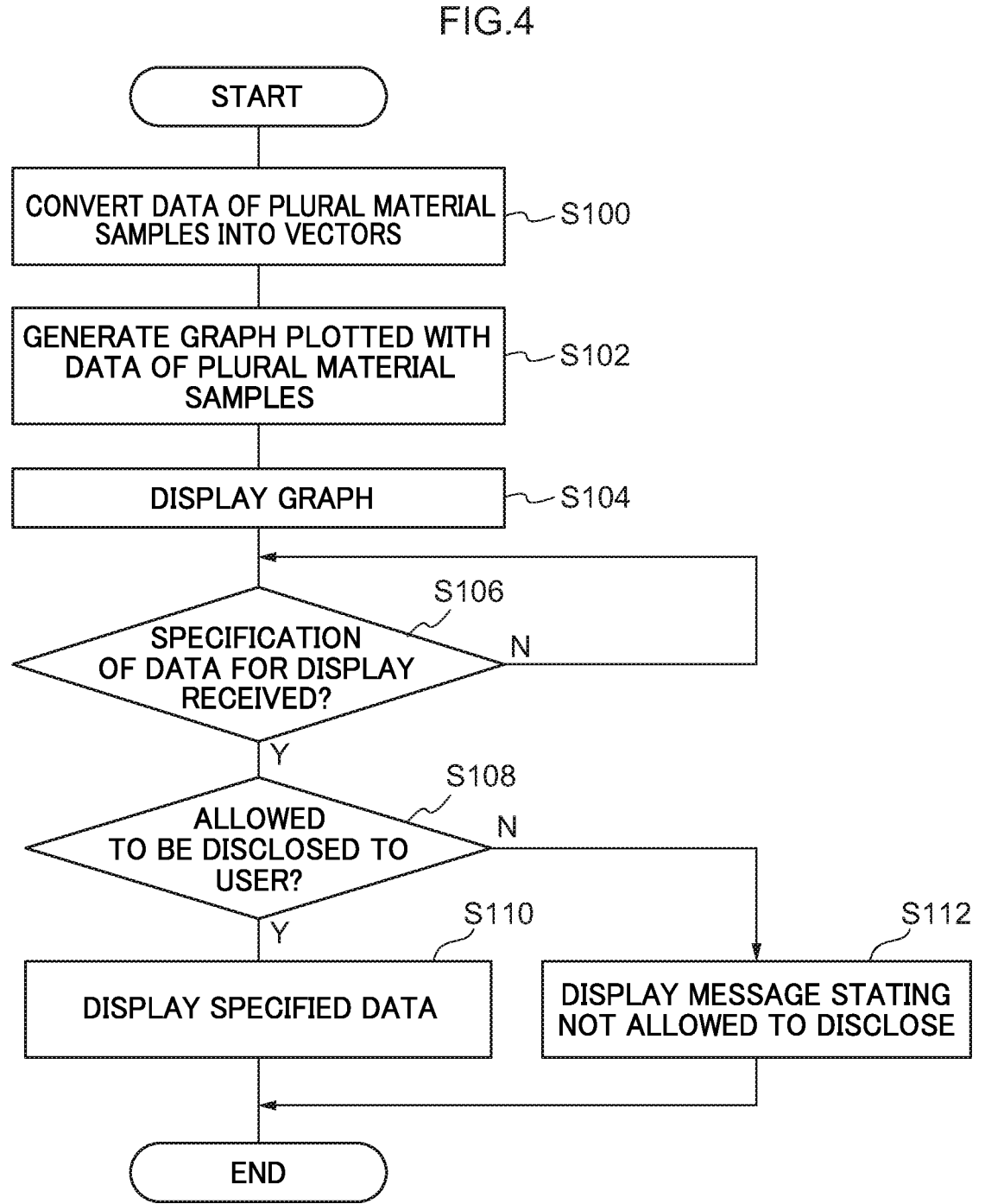
FIG. 4 is a flowchart illustrating an example of a display processing routine performed in an information processing device according to an exemplary embodiment.

When a request to display material sample data is input to the user terminal 14, the material sample data display request is transmitted to the cloud server 12. The cloud server 12 then executes a display processing routine as illustrated in FIG. 4.

At step S100, the conversion section 22 converts the plural data related to the plural material samples into vectors in a latent space.

At step S102, the reception section 24 generates a screen displaying a graph plotted with the plural data related to the plural material samples according to the vectors in the latent space.

At step S104, the reception section 24 displays the screen generated at step S102 on the user terminal 14.

At step S106, the reception section 24 determines whether or not specification has been received from the user terminal 14 of a material sample on the graph being displayed on the user terminal 14. Processing proceeds to step S108 in cases in which specification of a material sample on the graph being displayed on the user terminal 14 has been received from the user terminal 14.

At step S108, based on the secrecy level or authorized disclosure parties of the data related to the specified material sample, the determination section 28 determines whether or not the information related to the data is allowed to be disclosed to the user of the user terminal 14. Processing transitions to step S110 in cases in which determination is that the information related to the data is allowed to be disclosed to the user of the user terminal 14. However, processing transitions to step S112 in cases in which determination is that the information related to the data is not allowed to be disclosed to the user of the user terminal 14.

At step S110, the information display section 30 acquires from the database 32 the data related to the specified material sample, displays this on the user terminal 14, and then ends the display processing routine.

At step S112, the information display section 30 displays a message on the user terminal 14 stating that the data related to the specified material sample is not allowed to be disclosed, and then ends the display processing routine.

Figure 5:
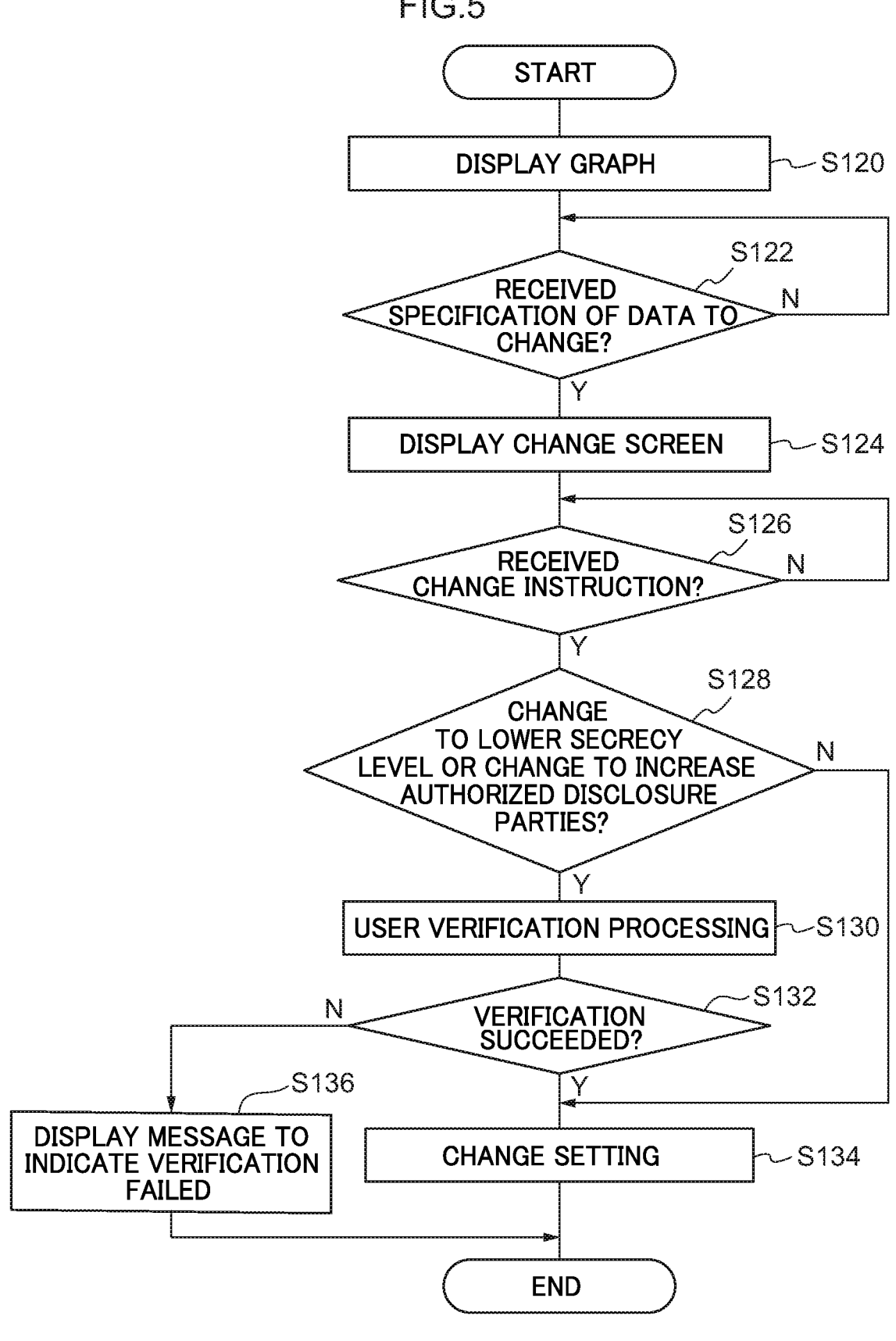
FIG. 5 is a flowchart illustrating an example of an information processing routine performed in an information processing device according to an exemplary embodiment.

When a request has been input to the user terminal 14 to change a setting of data of a material sample, the setting change request for the material sample data is transmitted to the cloud server 12. The cloud server 12 then executes an information processing routine as illustrated in FIG. 5.

At step S120, the reception section 24 displays the screen generated at step S102 on the user terminal 14.

At step S122, the reception section 24 determines whether or not specification of at least one material sample on the graph has been received from the user terminal 14. Processing transitions to step S124 in cases in which specification of at least one material sample on the graph has been received from the user terminal 14.

At step S124, the reception section 24 displays a change screen for receiving changes to the secrecy level or authorized disclosure parties of the data related to the specified material sample on the user terminal 14.

At step S126, the reception section 24 determines whether or not an instruction to change the secrecy level or authorized disclosure parties of the data related to the specified material sample has been received from the user terminal 14 via the change screen. Processing transitions to step S128 in cases in which a change to the secrecy level or authorized disclosure parties of the data related to the specified material sample has been received from the user terminal 14 via the change screen.

At step S128, the verification section 26 determines whether or not a change to lower the secrecy level or a change to increase the authorized disclosure parties has been received at step S126. Processing transitions to step S130 in cases in which a change to lower the secrecy level or a change to increase the authorized disclosure parties has been received. However, processing transitions to step S134 in cases in which the change received was neither a change to lower the secrecy level nor a change to increase the authorized disclosure parties.

At step S130, the verification section 26 displays a verification screen to perform user verification processing on the user terminal 14, and performs the verification processing.

At step S132, the verification section 26 determines whether or not verification succeeded at step S130. Processing transitions to step S134 when verification succeeded. However, processing transitions to step S136 when verification failed.

At step S134, the reception section 24 changes the setting of the secrecy level or authorized disclosure parties for the data related to the specified material sample according to the change received at step S126, and then ends the information processing routine.

At step S136, the information display section 30 displays a message indicating failed verification on the user terminal 14, and then ends the information processing routine.

As described above, a server of an information processing system according to an exemplary embodiment displays a graph of plotted material data corresponding to vectors in a latent space, and receives changes to the secrecy level or authorized disclosure parties of the material data on the graph. This thereby enables both convenience and data secrecy to be achieved when changing the secrecy level and authorized disclosure parties of the data.

Moreover, user verification processing is performed when a change to lower the secrecy level or a change to increase the authorized disclosure parties has been received. This enables a change to lower the secrecy level or a change to increase the authorized disclosure parties only to be made when the user verification processing has succeeded. This accordingly enables mistaken lowering of the secrecy level of the data to be suppressed.

Moreover, information related to the specified data is displayed when determined that the information related to the data is allowed to be displayed to the user based on receipt of specification of data on the graph and also on the secrecy level or authorized disclosure parties of the specified data. This accordingly enable the convenience to be improved when displaying the information related to the data.

Note that although a description has been given in which the processing performed by the respective devices of the exemplary embodiment described above is software processing performed by executing a program, this processing may be performed by hardware. Alternatively, the processing may performed by a combination of software and hardware. The program stored in ROM may be distributed in a format stored on various storage media.

Moreover, the present disclosure is not limited by the above description, and obviously various other modifications may be implemented within a scope not departing from the spirit of the present disclosure.

What is claimed is:

1. An information processing device, comprising:
a memory storing instructions, and
a processor coupled to the memory, wherein the processor is configured to execute the instructions to cause the information processing device to:
   receive material sample data transmitted from one or more user terminals, the material sample data comprising measurement data of a material sample or analysis data of the material sample;
   convert the material sample data into a plurality of vectors in a latent space;
   generate a graph plotted according to the plurality of vectors in the latent space, wherein the graph comprises a plurality of points;
   receive a first request transmitted from a first user terminal to access the graph, and transmit information to the first user terminal to cause the first user terminal to display the graph;
   receive information transmitted from the first user terminal indicating a selection of a subset of points of the plurality of points;
   receive a second request transmitted from the first user terminal to (i) lower a secrecy level of data corresponding to the subset of points or (ii) increase a range of users authorized to access the data corresponding to the subset of points; and
   perform verification processing of a first user of the first user terminal to determine whether the first user is authorized to (i) lower the secrecy level or (ii) increase the range of users authorized to access the data corresponding to the subset of points, and, based on the verification processing succeeding, (i) lowering the secrecy level or (ii) increasing the range of users authorized to access the data corresponding to the subset of points.

2. The information processing device of claim 1, wherein the processor is further configured to:

based (i) on receipt of the selection of the subset of points and (ii) on the secrecy level or the range of users authorized to access the data corresponding to the subset of points, determine whether information related to the data is permitted to be displayed to the first user; and based on determining that the information is permitted to be displayed, transmit the information related to the data to the first user terminal to cause the first user terminal to display the information related to the data.

3. The information processing device of claim 1, wherein the processor is further configured to execute the instructions to cause the information processing device to, in response to the verification processing failing, preventing (i) lowering of the secrecy level or (ii) increasing the range of users authorized to access the data, corresponding to the subset of points.

4. The information processing device of claim 1, wherein the material sample data comprises at least one from among X-ray diffraction data, small angle X-ray scattering data, microscope image data, Raman spectrometry data, or infrared spectrometry data.

5. The information processing device of claim 1, wherein the processor is further configured to execute the instructions to cause the information processing device to:

receive a third request, transmitted from a second user terminal, for a second user of the second user terminal to access the graph, including the data corresponding to the subset of points; and transmit information to the second user terminal to cause the second user terminal to display the graph without the data corresponding to the subset of points based on the second user not being authorized to access the data corresponding to the subset of points.

6. The information processing device of claim 1, wherein the processor is configured to execute the instructions to cause the information processing device to:

set an initial secrecy level and an initial range of authorized users for each point in the plurality of points, wherein the information transmitted to the first user terminal is based on a second verification process, the second verification process is based on the initial secrecy level and the initial range of authorized users for each point in the plurality of points, the verification processing is a first verification process, and the first verification process and the second verification process are different.

7. The information processing device of claim 1, wherein the information indicating the selection of the subset of points comprises an indication of an area of the graph, the area of the graph comprising the subset of points.

8. An information processing method comprising, by a computer:

receiving material sample data transmitted from one or more user terminals, the material sample data comprising measurement data of a material sample or analysis data of the material sample;

converting the material sample data into a plurality of vectors in a latent space;

generating a graph plotted according to the plurality of vectors in the latent space, wherein the graph comprises a plurality of points;

receiving a first request transmitted from a first user terminal to access the graph, and transmitting information to the first user terminal to cause the first user terminal to display the graph;

receiving information transmitted from the first user terminal indicating a selection of a subset of points of the plurality of points;

receiving a second request transmitted from the first user terminal to (i) lower a secrecy level of data corresponding to the subset of points or (ii) increase a range of users authorized to access the data corresponding to the subset of points; and performing verification processing of a first user of the first user terminal to determine whether the first user is authorized to (i) lower the secrecy level or (ii) increase the range of users authorized to access the data corresponding to the subset of points, and, based on the verification processing succeeding, (i) lowering the secrecy level or (ii) increasing the range of users authorized to access the data corresponding to the subset of points.

9. A non-transitory recording medium storing a program that is executable by a computer to perform processing comprising:

receiving material sample data transmitted from one or more user terminals, the material sample data comprising measurement data of a material sample or analysis data of the material sample;

converting the material sample data into a plurality of vectors in a latent space;

generating a graph plotted according to the plurality of vectors in the latent space, wherein the graph comprises a plurality of points;

receiving a first request transmitted from a first user terminal to access the graph, and transmitting information to the first user terminal to cause the first user terminal to display the graph;

receiving information transmitted from the first user terminal indicating a selection of a subset of points of the plurality of points;

receiving a second request transmitted from the first user terminal to (i) lower a secrecy level of data corresponding to the subset of points or (ii) increase a range of users authorized to access the data corresponding to the subset of points; and performing verification processing of a first user of the first user terminal to determine whether the first user is authorized to (i) lower the secrecy level or (ii) increase the range of users authorized to access the data corresponding to the subset of points, and, based on the verification processing succeeding, (i) lowering the secrecy level or (ii) increasing the range of users authorized to access the data corresponding to the subset of points.

* * * * *